United States Patent
Dayton et al.

(10) Patent No.: US 9,587,786 B2
(45) Date of Patent: Mar. 7, 2017

(54) ENGINE VALVETRAIN OIL CONTROL VALVE

(71) Applicant: Eaton Corporation, Cleveland, OH (US)

(72) Inventors: Robert Andrew Dayton, Attica, MI (US); Robert John Boychuk, Sterling Heights, MI (US); Daniel William Bamber, Farmington Hills, MI (US); Fred Andrew Weeks, Lapeer, MI (US)

(73) Assignee: Easton Corporation, Cleveland, OH (US)

( * ) Notice: Subject to any disclaimer, the term of this patent is extended or adjusted under 35 U.S.C. 154(b) by 86 days.

(21) Appl. No.: 14/570,363

(22) Filed: Dec. 15, 2014

(65) Prior Publication Data

US 2015/0096636 A1 Apr. 9, 2015

Related U.S. Application Data

(63) Continuation of application No. PCT/US2014/027513, filed on Mar. 14, 2014.
(Continued)

(51) Int. Cl.
*F16N 25/02* (2006.01)
*F01L 13/00* (2006.01)
(Continued)

(52) U.S. Cl.
CPC .......... *F16N 25/02* (2013.01); *F01L 13/0005* (2013.01); *F16K 11/0716* (2013.01); *F16K 27/029* (2013.01); *F16K 31/0634* (2013.01); *F16K 31/1245* (2013.01); *F01L 2001/3443* (2013.01); *F16K 11/07* (2013.01); *F16K 31/124* (2013.01); *Y10T 137/8671* (2015.04); *Y10T 137/86614* (2015.04)

(58) Field of Classification Search
CPC ...... F01L 13/0005; F16N 25/02; F16K 11/07; F16K 31/124; Y10T 137/8671; Y10T 137/86614
USPC ......................... 137/625.64, 625.69
See application file for complete search history.

(56) References Cited

U.S. PATENT DOCUMENTS 4,276,960 A * 7/1981 Webb .................. F04C 29/0014
137/115.14
4,741,364 A * 5/1988 Stoss .................. F15B 13/0402
137/625.6
(Continued)

*Primary Examiner* — Michael R Reid
*Assistant Examiner* — Christopher Ballman
(74) *Attorney, Agent, or Firm* — Quinn Law Group, PLLC

(57) ABSTRACT

An oil control valve assembly includes a valve body and a controller coupled to an exterior end of the valve body. The controller includes a solenoid housing attached to the exterior end of the valve body, and defines an interior region. An encapsulated coil assembly is disposed within the interior region of the solenoid housing. A housing seal is disposed within the interior region of the solenoid housing, in sealing engagement with the solenoid housing, the valve body, and the encapsulated coil assembly. The housing seal is operable to seal the interior region of the solenoid housing to prevent fluid communication between the solenoid housing and the valve body. An adapter assembly is coupled to the valve body to reposition a discharge location of a supply port, a control port, and an exhaust port of the valve body along a longitudinal axis of the valve body.

20 Claims, 2 Drawing Sheets

Related U.S. Application Data

(60) Provisional application No. 61/781,114, filed on Mar. 14, 2013.

(51) Int. Cl.
  *F16K 31/06* (2006.01)
  *F16K 27/02* (2006.01)
  *F16K 11/07* (2006.01)
  *F16K 31/124* (2006.01)
  *F01L 1/344* (2006.01)

(56) References Cited

U.S. PATENT DOCUMENTS

| | | | | |
|---|---|---|---|---|
| 4,895,192 A * | 1/1990 | Mortenson | ............ | F01M 11/04 137/625.68 |
| 5,024,459 A * | 6/1991 | Kokubo | ............ | B60G 17/016 280/124.159 |
| 5,042,832 A * | 8/1991 | Takahashi | ............ | B60G 17/018 137/625.64 |
| 5,855,228 A * | 1/1999 | Perach | ............ | F15B 13/0405 137/269 |
| 6,571,828 B2 * | 6/2003 | Harms | ............ | F15B 13/0402 137/625.61 |
| 6,701,959 B1 * | 3/2004 | Flynn | ............ | F01L 1/14 137/625.27 |
| 6,904,937 B2 * | 6/2005 | Fischer | ............ | F01L 1/34 137/625.64 |
| 6,938,873 B2 * | 9/2005 | Fischer | ............ | F01L 1/267 251/30.01 |
| 8,757,208 B2 * | 6/2014 | Dornbach | ............ | F16K 27/041 137/625.61 |
| 2001/0027815 A1 * | 10/2001 | Sakata | ............ | F15B 13/0402 137/625.65 |
| 2004/0129322 A1 * | 7/2004 | Chen | ............ | F16K 31/0613 137/625.65 |
| 2009/0050222 A1 * | 2/2009 | Jackson | ............ | F15B 11/042 137/625.65 |
| 2009/0301588 A1 * | 12/2009 | Shimizu | ............ | F16H 61/0021 137/625.64 |
| 2010/0019186 A1 * | 1/2010 | Keller | ............ | F01L 9/02 251/366 |
| 2011/0089350 A1 * | 4/2011 | Beneker | ............ | F01L 1/34 251/129.15 |
| 2012/0056117 A1 * | 3/2012 | Nishinosono | ............ | F15B 13/0402 251/129.15 |
| 2012/0291727 A1 * | 11/2012 | Keller | ............ | F01L 13/0005 123/90.12 |
| 2012/0291889 A1 * | 11/2012 | Choi | ............ | F02D 13/0253 137/512 |

* cited by examiner

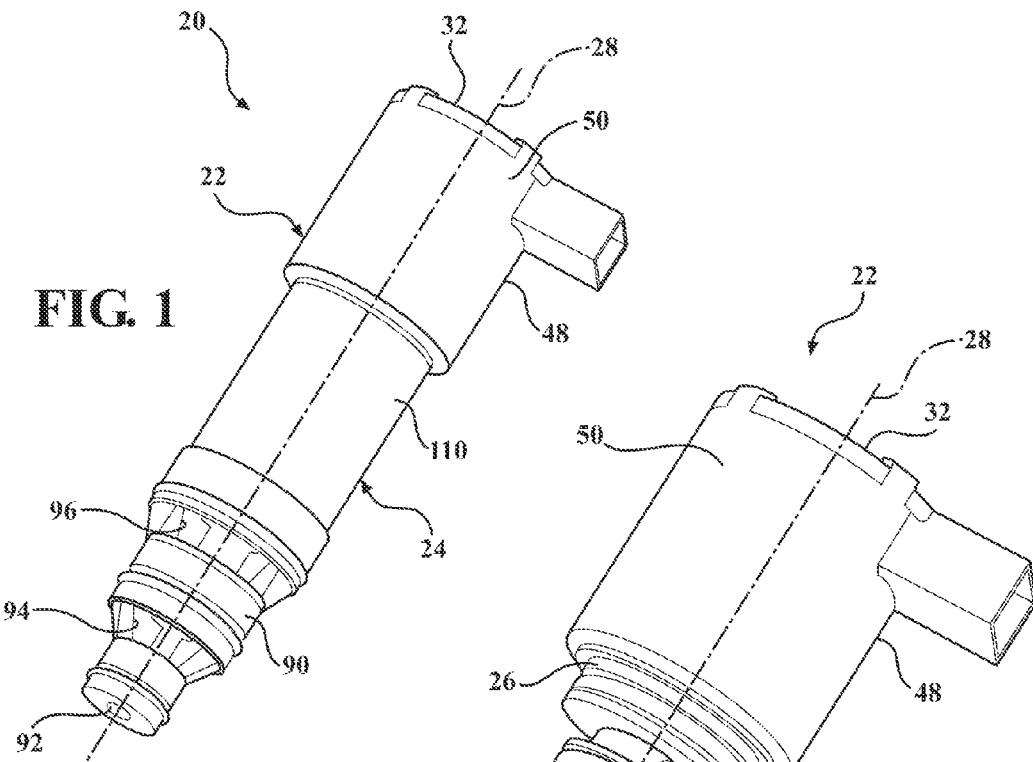
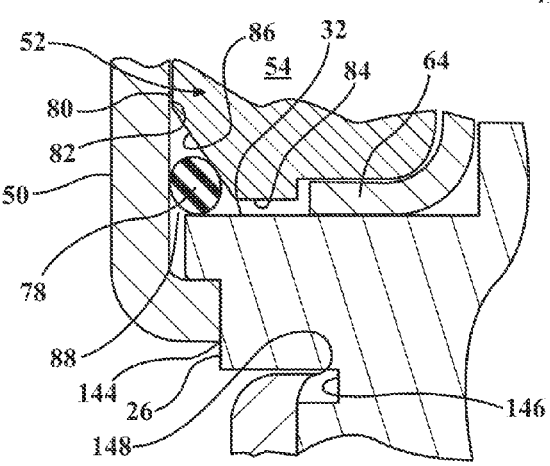
FIG. 1
FIG. 3
FIG. 4

ENGINE VALVETRAIN OIL CONTROL VALVE

CROSS-REFERENCE TO RELATED APPLICATIONS

This application is a bypass continuation application of International Application No. PCT/US2014/027513 filed on Mar. 14, 2014, which claims priority to U.S. Provisional Application No. 61/781,114 filed on Mar. 14, 2013.

TECHNICAL FIELD

The present teachings generally include an oil control valve for a valvetrain of an engine.

BACKGROUND

Hydraulic control systems for engines include oil control valves that are used to control oil under pressure for various purposes, such as but not limited to switching latch pins in switching lifters, lash adjusters, and rocker arms for cam switching. The oil control valves all operate in the same manner to control oil flow, but because they are located at different locations on the engine, fluid ports of the different oil control valves may have to be positioned at different relative axial locations along a central axis of the oil control valve.

SUMMARY

An oil control valve assembly for a vehicle is provided. The oil control valve assembly includes a valve body that extends along a longitudinal axis between an interior end and an exterior end. The valve body includes a supply land, a control land, and an exhaust land; and defines a secondary supply port, a secondary supply port, a primary control port, and a primary exhaust port. The secondary supply port is disposed at the interior rend of the valve body. The secondary supply port is disposed nearer the interior end of the valve body than the primary control port and the primary exhaust port. The secondary supply port is disposed radially nearer the longitudinal axis than the primary control port and the primary exhaust port. The primary control port is disposed nearer the interior end of the valve body than the primary exhaust port. The primary control port is disposed radially nearer the longitudinal axis than the primary exhaust port. The supply land is disposed between the secondary supply port and the primary control port. The control land is disposed between the primary control port and the primary exhaust port. The exhaust land is disposed between the primary exhaust port and the exterior end of the valve body. An adapter assembly is coupled to the valve body. The adapter assembly includes an adapter body that extends along the longitudinal axis. The adapter body defines an adapter supply port, an adapter control port, and an adapter exhaust port. A supply tube is attached to the adapter body and supported by the supply land. The supply tube includes an interior that defines a supply passage in fluid communication with the primary supply port, the secondary supply port, and the adapter supply port. A control tube is attached to the adapter body and supported by the control land. The control tube includes an interior that defines a control passage in fluid communication with the primary control port and the adapter supply port. An exhaust tube is attached to the adapter body and supported by the exhaust land. The exhaust tube includes an interior that defines an exhaust passage in fluid communication with the primary exhaust port and the adapter exhaust port.

An oil control valve is also provided. The oil control valve includes a valve body that extends along a longitudinal axis between an interior end and an exterior end. A controller is coupled to the exterior end of the valve body. The controller includes a solenoid housing that is attached to the exterior end of the valve body. The solenoid housing defines an interior region. An encapsulated coil assembly is supported by and disposed within the interior region of the solenoid housing. A housing seal is disposed within the interior region of the solenoid housing, in sealing engagement with the solenoid housing, the valve body, and the encapsulated coil assembly. The housing seal is operable to seal the interior region of the solenoid housing to prevent fluid communication between the solenoid housing and the valve body.

Accordingly, the adapter assembly is attached to the valve body to effectively axially relocate the fluid ports of the oil control valve along the longitudinal axis so that the same oil control valve may be used at different locations on the engine. The oil control valve includes the housing seal to prevent any contamination that may enter into the solenoid housing from passing into the sealed chambers of the engine, thereby allowing the control valve to be used in different locations of the engine.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic perspective view of an oil control valve assembly.

FIG. 3 is a schematic perspective view of an oil control valve of the oil control valve assembly.

FIG. 4 is an enlarged schematic fragmentary perspective view of the oil control valve assembly showing a housing seal.

DETAILED DESCRIPTION

Figure 2:
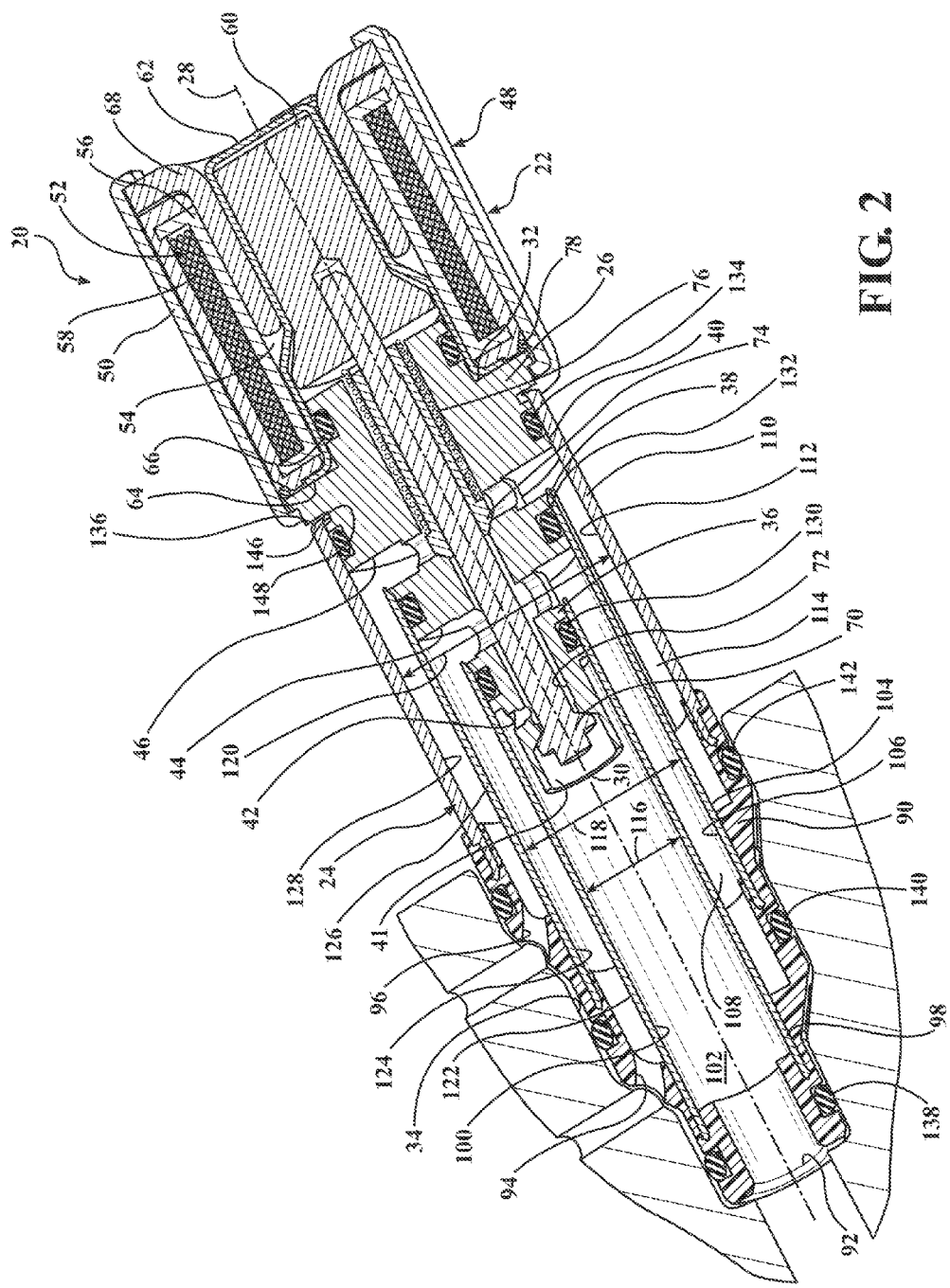
FIG. 2 is a schematic cross sectional view of the oil control valve assembly.

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Referring to the Figures, wherein like numerals indicate like parts throughout the several views, an oil control valve assembly is generally shown at 20. The oil control valve assembly 20 includes an oil control valve 22 and an adapter assembly 24. The oil control valve 22 may be used independently of the adapter assembly 24, or may be combined with the adapter assembly 24 to form the oil control valve assembly 20. The oil control valve 22, with our without the adapter assembly 24, is used to control a flow of hydraulic fluid, e.g., oil, which is used to actuate various components of an engine. The oil control valve 22 is shown in FIGS. 1 and 2 with the adapter assembly 24 attached thereto. The oil control valve 22 is shown in FIG. 3 without the adapter assembly 24 attached thereto.

Referring to FIG. 2, the oil control valve 22 includes a valve body 26 that extends along a longitudinal axis 28, between an interior end 30 and an exterior end 32 of the valve body 26. The interior end 30 of the valve body 26 is configured for insertion into a bore 34, which defines fluid passageways in fluid communication with the component to be controlled. The valve body 26 includes a supply land 36, a control land 38, and an exhaust land 40, and defines a primary supply port 41, a secondary supply port 42, a primary control port 44, and a primary exhaust port 46. The primary supply port 41 is disposed at the interior end 30 of the valve body 26. The secondary supply port 42 is disposed nearer the interior end 30 of the valve body 26 than the primary control port 44 and the primary exhaust port 46. The secondary supply port 42 is disposed radially nearer the longitudinal axis 28 than the primary control port 44 and the primary exhaust port 46. The primary control port 44 is disposed nearer the interior end 30 of the valve body 26 than the primary exhaust port 46. The primary control port 44 is disposed radially nearer the longitudinal axis 28 than the primary exhaust port 46. The supply land 36 is disposed between the support port and the primary control port 44. The control land 38 is disposed between the primary control port 44 and the primary exhaust port 46. The exhaust land 40 is disposed between the primary exhaust port 46 and the exterior end 32 of the valve body 26.

A controller 48, e.g., a solenoid, is coupled to the exterior end 32 of the valve body 26. The controller 48 shown in FIG. 2 and described herein is a solenoid controller 48. However, it should be appreciated that the controller 48 may include some other device capable of controlling the flow of fluid through the valve body 26. The controller 48 includes a housing, hereinafter referred to as a solenoid housing 50, which is attached to the exterior end 32 of the valve body 26. An encapsulated coil assembly 52 is supported by and disposed within an interior region 54 of the solenoid housing 50. The encapsulated coil assembly 52 includes a bobbin 56 and a wire magnet 58. An armature 60 is concentrically disposed about the longitudinal axis 28 and responsive to move axially along the longitudinal axis 28. An armature cap 62 positions the armature 60 relative to the solenoid housing 50. The armature cap 62 includes a flange 64 disposed against the exterior end 32 of the valve body 26, and secured in position relative to the valve body 26 by the encapsulated coil assembly 52. An armature cap seal 66 is supported by and disposed between the valve body 26 and the armature cap 62. The armature cap seal 66 is operable to seal between the valve body 26 and the armature cap 62. A flux collector 68 (also referred to as a flux bracket) radially supports the armature cap 62, and is disposed between the armature cap 62 and the encapsulated coil assembly 52.

The controller 48 is engaged and/or disengaged to move a push pin 70 axially along the longitudinal axis 28. The push pin 70 is disposed within a central bore 72 defined by the valve body 26, which extends along and is concentric about the longitudinal axis 28. The push pin 70 is coupled to the armature 60 for movement with the armature 60 along the longitudinal axis 28. An exhaust poppet 74 is disposed within the central bore 72 of the valve body 26, radially about an exterior of the push pin 70. The exhaust poppet 74 is moveable along the longitudinal axis 28 relative to the push pin 70 and the valve body 26. An exhaust spring 76 is disposed within the central bore 72 of the valve body 26, radially about the exhaust poppet 74. The exhaust spring 76 biases the exhaust poppet 74 away from the armature 60 and into a blocking position to seal the primary exhaust port 46.

The armature 60 and the push pin 70 connected thereto are movable in the central bore 72 of the valve body 26 in response to electrically energizing the encapsulated coil assembly 52. The encapsulated coil assembly 52, the armature 60 and flux collector 68 form an electromagnet. Lines of flux are created in an air gap between the encapsulated coil assembly 52 and the armature 60 when the encapsulated coil assembly 52 is energized by an electric source, such as but not limited to a battery (not shown). The armature 60 moves along the longitudinal axis 28 in response to the flux. The encapsulated coil assembly 52 is energized under the control of an electronic controller 48 (not shown) in response to various engine operating conditions. The controller 48 may be engaged, i.e., an electric current applied to the controller 48, to move the push pin 70 along the longitudinal axis 28 to open fluid communication through the primary supply port 41. Alternatively, the controller 48 may be engaged, i.e., an electric current applied to the controller 48, to move the push pin 70 along the longitudinal axis 28 to close fluid communication through the primary supply port 41. The secondary supply port 42 is always open to fluid pressure to communicate fluid pressure therethrough into the central bore 72 of the valve body 26. This allows make-up oil to flow to the hydraulic system through the primary control port 44 and the primary exhaust port 46, depending on the hydraulic system backpressure. When the push pin 70 is moved to open fluid communication through the primary supply port 41, a much larger flow of the supply oil is allowed into the central bore 72 and through the oil control valve 22.

Referring to FIG. 4, a housing seal 78 is disposed within the interior region 54 of the solenoid housing 50. The housing seal 78 is disposed in sealing engagement with the solenoid housing 50, the valve body 26, and the encapsulated coil assembly 52. The housing seal 78 is operable to seal the interior region 54 of the solenoid housing 50 to prevent fluid communication between the solenoid housing 50 and the valve body 26, and to prevent contamination that may enter the controller 48 from exiting the solenoid housing 50, at a location identified in FIG. 4 by reference numeral 144.

The encapsulated coil assembly 52 includes an outer surface 80 that is disposed adjacent an interior surface 82 of the solenoid housing 50. The encapsulated coil assembly 52 includes an axial end surface 84 that is disposed adjacent the exterior end 32 of the valve body 26. The encapsulated coil assembly 52 includes an annular chamfered surface 86. The annular chamfered surface 86 interconnects the outer surface 80 of the encapsulated coil assembly 52 and the axial end surface 84 of the encapsulated coil assembly 52, and extends annularly around the longitudinal axis 28. As such, the annular chamfered surface 86 forms a chamfered radially outer corner of the encapsulated coil assembly 52 to provide space within the interior region 54 of the solenoid housing 50 for the housing seal 78. The annular chamfered surface 86 is sized to accommodate the housing seal 78 along an annular interface 88 between the solenoid housing 50 and the valve body 26. The housing seal 78 is disposed adjacent and in sealing engagement with the annular chamfered surface 86, the interior surface 82 of the solenoid housing 50, and the exterior end 32 of the valve body 26.

The adapter assembly 24 is shown in FIGS. 1 and 2 coupled to the valve body 26. The adapter assembly 24 is operable to reposition a discharge location of each of the secondary supply port 42, the primary control port 44, and the primary exhaust port 46 along the longitudinal axis 28 relative to the valve body 26 to effectively lengthen the valve body 26 along the longitudinal axis 28.

Referring to FIG. 2, the adapter assembly 24 includes an adapter body 90 that extends along the longitudinal axis 28. The adapter body 90 defines an adapter supply port 92, an adapter control port 94, and an adapter exhaust port 96. A supply tube 98 is attached to the adapter body 90, and is supported by the supply land 36. The supply tube 98 includes a supply interior 100 that defines a supply passage 102 in fluid communication with the secondary supply port 42 and the adapter supply port 92. A control tube 104 is attached to the adapter body 90 and supported by the control land 38. The control tube 104 includes a control interior 106 that defines a control passage 108 in fluid communication with the primary control port 44 and the adapter supply port 92. An exhaust tube 110 is attached to the adapter body 90 and supported by the exhaust land 40. The exhaust tube 110 includes an exhaust interior 112 that defines an exhaust passage 114 in fluid communication with the primary exhaust port 46 and the adapter exhaust port 96. The supply tube 98, the control tube 104 and the exhaust tube 110 may be attached to the adapter body 90 in any suitable manner, including but not limited to injection molding the adapter body 90 over each of the supply tube 98, the control tube 104 and the exhaust tube 110.

The supply interior 100 of the supply tube 98 defines a supply diameter 116, the control interior 106 of the control tube 104 defines a control diameter 118, and the exhaust interior 112 of the exhaust tube 110 defines an exhaust diameter 120. The exhaust diameter 120 is larger than both of the control diameter 118 and the supply diameter 116. The control diameter 118 is larger than the supply diameter 116. The supply tube 98, the control tube 104, and the exhaust tube 110 each include a diametric center line that is coaxially disposed with each other along the longitudinal axis 28 of the valve body 26.

The supply tube 98 is disposed within the control interior 106 of the control tube 104 and cooperates with the control tube 104 to define the control passage 108. The control passage 108 is defined between an exterior surface 122 of the supply tube 98 and an interior surface 124 of the control tube 104. The control tube 104 is disposed within the exhaust interior 112 of the exhaust tube 110 and cooperates with the exhaust tube 110 to define the exhaust passage 114. The exhaust passage 114 is defined between an exterior surface 126 of the control tube 104 and an interior surface 128 of the exhaust tube 110.

A first primary seal 130 is supported by the supply land 36 of the valve body 26. The first primary seal 130 is operable to seal between the supply tube 98 and the valve body 26 to prevent fluid communication between the secondary supply port 42 and the primary control port 44. A second primary seal 132 is supported by the control land 38 of the valve body 26. The second primary seal 132 is operable to seal between the control tube 104 and the valve body 26 to prevent fluid communication between the primary control port 44 and the primary exhaust port 46. A third primary seal 134 is supported by the exhaust land 40 of the valve body 26. The third primary seal 134 is operable to seal between the exhaust tube 110 and the valve body 26 to prevent fluid communication between the primary exhaust port 46 and a distal end 136 of the exhaust tube 110.

A first adapter seal 138 is supported by the adapter body 90 and axially disposed along the longitudinal axis 28 between the adapter supply port 92 and the adapter control port 94. The first adapter seal 138 is operable to seal against a wall of the bore 34 to prevent fluid communication between the adapter supply port 92 and the adapter control port 94. A second adapter seal 140 is supported by the adapter body 90 and axially disposed along the longitudinal axis 28 between the adapter control port 94 and the adapter exhaust port 96. The second adapter seal 140 is operable to seal against the wall of the bore 34 to prevent fluid communication between the adapter control port 94 and the adapter exhaust port 96. A third adapter seal 142 is supported by the adapter body 90 and axially disposed along the longitudinal axis 28 between the adapter exhaust port 96 and the distal end 136 of the exhaust tube 110. The third adapter seal 142 is operable to seal against the wall of the bore 34 to prevent fluid communication between the adapter exhaust port 96 and the distal end 136 of the exhaust tube 110.

Referring to FIGS. 2 and 4, the valve body 26 defines an annular channel 146. The annular channel 146 extends around an outer circumference of the valve body, and extends radially inward into the valve body 26, toward the longitudinal axis 28. The exhaust tube 110 includes a radially compressed portion 148 disposed at the distal end 136 if the exhaust tube 110. The radially compressed portion 148 defines a diameter that is smaller than the exhaust diameter 120, and extends radially into the annular channel 146 in a snap fit engagement with the valve body 26 to secure the adapter assembly 24 to the oil control valve 22.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The following list presents the various features and associated reference numerals described above.

20 oil control valve assembly
22 oil control valve
24 adapter assembly
26 valve body
28 longitudinal axis
30 interior end (of valve body 26)
32 exterior end (of valve body 26)
34 bore
36 supply land
38 control land
40 exhaust land
41 primary supply port
42 secondary supply port
44 primary control port
46 primary exhaust port
48 controller
50 solenoid housing
52 encapsulated coil assembly
54 interior region (of solenoid housing 50)
56 bobbin
58 wire magnet
60 armature
62 armature cap
64 flange
66 armature cap seal
68 flux collector
70 push pin
72 central bore
74 exhaust poppet
76 exhaust spring
78 housing seal
80 outer surface (of encapsulated coil assembly 52)

82 interior surface (of solenoid housing 50)
84 axial end (of encapsulated coil assembly 52)
86 annular chamfered surface (of encapsulate coil assembly)
88 annular interface (between interior surface 82 of solenoid housing 50 and valve body 26)
90 adapter body
92 adapter supply port
94 adapter control port
96 adapter exhaust port
98 supply tube
100 supply interior (of supply tube 98)
102 supply passage
104 control tube
106 control interior (of control tube 104)
108 control passage
110 exhaust tube
112 exhaust interior (of exhaust tube 110)
114 exhaust passage
116 supply diameter
118 control diameter
120 exhaust diameter
122 exterior surface (of supply tube 98)
124 interior surface (of control tube 104)
126 exterior surface (of control tube 104)
128 interior surface (of exhaust tube 110)
130 first primary seal
132 second primary seal
134 third primary seal
136 distal end (of exhaust tube 110)
138 first adapter seal
140 second adapter seal
142 third adapter seal
144 location of contamination outflow from solenoid housing 50
146 annular channel
148 radially compressed portion

The invention claimed is:

1. An oil control valve assembly for a vehicle, the oil control valve assembly comprising:
a valve body extending along a longitudinal axis between an interior end and an exterior end, including a supply land, a control land, and an exhaust land, and defining a primary supply port, a secondary supply port, a primary control port, and a primary exhaust port;
wherein the primary supply port is disposed at the interior end of the valve body;
wherein the secondary supply port is disposed nearer the interior end of the valve body than the primary control port and the primary exhaust port, and the secondary supply port is disposed radially nearer the longitudinal axis than the primary control port and the primary exhaust port;
wherein the primary control port is disposed nearer the interior end of the valve body than the primary exhaust port, and the primary control port is disposed radially nearer the longitudinal axis than the primary exhaust port;
wherein the supply land is disposed between the secondary supply port and the primary control port, the control land is disposed between the primary control port and the primary exhaust port, and the exhaust land is disposed between the primary exhaust port and the exterior end of the valve body; and
an adapter assembly coupled to the valve body, the adapter assembly including:
an adapter body extending along the longitudinal axis and defining an adapter supply port, an adapter control port, and an adapter exhaust port;
a supply tube attached to the adapter body and supported by the supply land, with the supply tube including an supply interior that defines a supply passage in fluid communication with the primary supply port, the secondary supply port, and the adapter supply port;
a control tube attached to the adapter body and supported by the control land, with the control tube including an control interior that defines a control passage in fluid communication with the primary control port and the adapter supply port; and
an exhaust tube attached to the adapter body and supported by the exhaust land, with the exhaust tube including an exhaust interior that defines an exhaust passage in fluid communication with the primary exhaust port and the adapter exhaust port;
wherein the supply interior of the supply tube defines a supply diameter, the control interior of the control tube defines a control diameter, and the exhaust interior of the exhaust tube defines an exhaust diameter, with the exhaust diameter being larger than both of the control diameter and the supply diameter, and with the control diameter being larger than the supply diameter; and
wherein the supply tube, the control tube, and the exhaust tube each include a diametric center line that is coaxially disposed with each other along the longitudinal axis of the valve body.

2. An oil control valve assembly as set forth in claim 1 wherein the supply tube is disposed within the control interior of the control tube and cooperates with the control tube to define the control passage between an exterior surface of the supply tube and an interior surface of the control tube.

3. An oil control valve assembly as set forth in claim 1 wherein the control tube is disposed within the exhaust interior of the exhaust tube and cooperates with the exhaust tube to define the exhaust passage between an exterior surface of the control tube and an interior surface of the exhaust tube.

4. An oil control valve assembly as set forth in claim 1 wherein the adapter assembly further comprises:
a first adapter seal supported by the adapter body and axially disposed along the longitudinal axis between the adapter supply port and the adapter control port, wherein the first adapter seal is operable to seal against a bore wall to prevent fluid communication between the adapter supply port and the adapter control port;
a second adapter seal supported by the adapter body and axially disposed along the longitudinal axis between the adapter control port and the adapter exhaust port, wherein the second adapter seal is operable to seal against the bore wall to prevent fluid communication between the adapter control port and the adapter exhaust port;
a third adapter seal supported by the adapter body and axially disposed along the longitudinal axis between the adapter exhaust port and a distal end of the exhaust tube, wherein the third adapter seal is operable to seal against the bore wall to prevent fluid communication between the adapter exhaust port and the distal end of the exhaust tube;
a first primary seal supported by the supply land of the valve body and operable to seal between the supply tube and the valve body to prevent fluid communication between the secondary supply port and the primary control port;
a second primary seal supported by the control land of the valve body and operable to seal between the control tube and the valve body to prevent fluid communication between the primary control port 44 and the primary exhaust port; and
a third primary seal supported by the exhaust land of the valve body and operable to seal between the exhaust tube and the valve body to prevent fluid communication between the primary exhaust port and a distal end of the exhaust tube.

5. An oil control valve assembly as set forth in claim 1 further comprising a solenoid housing attached to the exterior end of the valve body, and an encapsulated coil assembly supported by and disposed within an interior region of the solenoid housing.

6. An oil control valve assembly as set forth in claim 5 further comprising a housing seal disposed within the interior region of the solenoid housing and disposed in sealing engagement with the solenoid housing, the valve body, and the encapsulated coil assembly.

7. An oil control valve assembly as set forth in claim 6 wherein the encapsulated coil assembly includes an outer surface disposed adjacent an interior surface of the solenoid housing, and an axial end surface disposed adjacent the exterior end of the valve body, and wherein the encapsulated coil assembly includes an annular chamfered surface interconnecting the outer surface and the axial end surface of the encapsulated coil assembly, with the housing seal disposed adjacent and in sealing engagement with the annular chamfered surface, the interior surface of the solenoid housing, and the exterior end of the valve body.

8. An oil control valve assembly as set forth in claim 1 wherein the valve body defines an annular channel extending radially inward from an outer circumference of the valve body, and wherein the exhaust tube includes a radially compressed end extending radially inward into the annular channel to secure the adapter assembly to the oil control valve.

9. An oil control valve assembly comprising:
a valve body extending along a longitudinal axis between an interior end and an exterior end;
an adapter assembly coupled to the valve body, the adapter assembly including:
an adapter body extending along the longitudinal axis and defining an adapter supply port, an adapter control port, and an adapter exhaust port;
a supply tube attached to the adapter body and including a supply interior that defines a supply passage;
a control tube attached to the adapter body and including a control interior that defines a control passage; and
an exhaust tube attached to the adapter body including an exhaust interior that defines an exhaust passage;
wherein the supply tube, the control tube, and the exhaust tube each include a diametric center line that is coaxially disposed with each other along the longitudinal axis of the valve body.

10. An oil control valve assembly as set forth in claim 9, wherein the valve body includes a supply land, a control land, and an exhaust land, and wherein the valve body includes a primary supply port, a secondary supply port, a primary control port, and a primary exhaust port.

11. An oil control valve assembly as set forth in claim 10, wherein the supply tube is supported by the supply land, and with the supply passage being in fluid communication with the primary supply port, the secondary supply port, and the adapter supply port.

12. An oil control valve assembly as set forth in claim 11, wherein the control tube is supported by the control land, and with the control passage being in fluid communication with the primary control port and the adapter supply port.

13. An oil control valve assembly as set forth in claim 12, wherein The exhaust tube is supported by the exhaust land, and with the exhaust passage being in fluid communication with the primary exhaust port and the adapter exhaust port.

14. An oil control valve assembly as set forth in claim 9, wherein the supply interior of the supply tube defines a supply diameter, the control interior of the control tube defines a control diameter, and the exhaust interior of the exhaust tube defines an exhaust diameter, with the exhaust diameter being larger than both of the control diameter and the supply diameter, and with the control diameter being larger than the supply diameter.

15. An oil control valve assembly as set forth in claim 9, wherein:
the primary supply port is disposed at the interior end of the valve body;
the secondary supply port is disposed nearer the interior end of the valve body than the primary control port and the primary exhaust port, and the secondary supply port is disposed radially nearer the longitudinal axis than the primary control port and the primary exhaust port;
the primary control port is disposed nearer the interior end of the valve body than the primary exhaust port, and the primary control port is disposed radially nearer the longitudinal axis than the primary exhaust port; and
the supply land is disposed between the secondary supply port and the primary control port, the control land is disposed between the primary control port and the primary exhaust port, and the exhaust land is disposed between the primary exhaust port and the exterior end of the valve body.

16. An oil control valve assembly as set forth in claim 9, wherein the supply tube is disposed within the control interior of the control tube and cooperates with the control tube to define the control passage between an exterior surface of the supply tube and an interior surface of the control tube.

17. An oil control valve assembly as set forth in claim 16, wherein the control tube is disposed within the exhaust interior of the exhaust tube and cooperates with the exhaust tube to define the exhaust passage between an exterior surface of the control tube and an interior surface of the exhaust tube.

18. An oil control valve assembly as set forth in claim 9, wherein the valve body defines an annular channel extending radially inward from an outer circumference of the valve body, and wherein the exhaust tube includes a radially compressed end extending radially inward into the annular channel to secure the adapter assembly to the valve body.

19. An oil control valve assembly as set forth in claim 9, further comprising:
a solenoid housing attached to the exterior end of the valve body, and an encapsulated coil assembly supported by and disposed within an interior region of the solenoid housing; and
a housing seal disposed within the interior region of the solenoid housing and disposed in sealing engagement with the solenoid housing, the valve body, and the encapsulated coil assembly;

wherein the encapsulated coil assembly includes an outer surface disposed adjacent an interior surface of the solenoid housing, and an axial end surface disposed adjacent the exterior end of the valve body, and wherein the encapsulated coil assembly includes an annular chamfered surface interconnecting the outer surface and the axial end surface of the encapsulated coil assembly, with the housing seal disposed adjacent and in sealing engagement with the annular chamfered surface, the interior surface of the solenoid housing, and the exterior end of the valve body.

20. An oil control valve assembly comprising:

an adapter body extending along the longitudinal axis and defining an adapter supply port, an adapter control port, and an adapter exhaust port;

a supply tube attached to the adapter body and including a supply interior that defines a supply passage;

a control tube attached to the adapter body and including a control interior that defines a control passage; and an exhaust tube attached to the adapter body including an exhaust interior that defines an exhaust passage;

wherein the supply tube is disposed within the control interior of the control tube and cooperates with the control tube to define the control passage between an exterior surface of the supply tube and an interior surface of the control tube;

wherein the control tube is disposed within the exhaust interior of the exhaust tube and cooperates with the exhaust tube to define the exhaust passage between an exterior surface of the control tube and an interior surface of the exhaust tube; and wherein the supply tube, the control tube, and the exhaust tube each include a diametric center line that is coaxially disposed with each other along the longitudinal axis of the valve body.

* * * * *